(12) United States Patent
Lee

(10) Patent No.: US 12,724,435 B2
(45) Date of Patent: Sep. 1, 2026

(54) WATER MIXING DEVICE AND WATER PURIFIER INCLUDING THE SAME

(71) Applicant: COWAY Co., Ltd., Gongju-si (KR)

(72) Inventor: Byoung Phil Lee, Seoul (KR)

(73) Assignee: COWAY Co., Ltd., Gongju-si (KR)

( * ) Notice: Subject to any disclaimer, the term of this patent is extended or adjusted under 35 U.S.C. 154(b) by 351 days.

(21) Appl. No.: 18/626,479

(22) Filed: Apr. 4, 2024

(65) Prior Publication Data

US 2024/0338043 A1 Oct. 10, 2024

(30) Foreign Application Priority Data

Apr. 4, 2023 (KR) ........................ 10-2023-0044113

(51) Int. Cl.
*G05D 11/13* (2006.01)
*B67D 1/00* (2006.01)
(Continued)

(52) U.S. Cl.
CPC ........... *G05D 11/132* (2013.01); *B67D 1/004* (2013.01); *B67D 1/0857* (2013.01);
(Continued)

(58) Field of Classification Search
CPC .. G05D 11/132; G05D 11/16; G05D 23/1393; B67D 1/004; B67D 1/0857;
(Continued)

(56) References Cited

U.S. PATENT DOCUMENTS 12,560,952 B2 * 2/2026 Heo ......................... C02F 1/001
2016/0362287 A1 * 12/2016 Yui .......................... B67D 1/10
2022/0397921 A1 * 12/2022 Mizuno .............. G05D 23/1917

FOREIGN PATENT DOCUMENTS

CN 211668042 U * 10/2020
KR 0155218 B1 * 1/1999 ........... F25D 31/005
(Continued)

OTHER PUBLICATIONS

Machine-generated English translation of KR 20130103976, generated on May 13, 2026.*
(Continued)

*Primary Examiner* — Fred Prince
(74) *Attorney, Agent, or Firm* — Oblon, McClelland, Maier & Neustadt, L.L.P.

(57) ABSTRACT

A water mixing device includes: a cold-water module including a cold-water tank, a cooler cooling the water accommodated in the cold-water tank, and a cold-water temperature sensor; a hot-water module including a hot-water tank that accommodates water discharged from the cold-water tank, and a heater that heats the water accommodated in the hot-water tank; a flow channel connected to the cold-water tank and the hot-water tank; a valve unit including valve modules opened or closed to adjust a flow of water in the flow channel; and a controller configured to control the valve modules. The flow channel mixes water cooled by the cooler and water heated by the heater to provide discharge water. When the temperature of water detected by the cold-water temperature sensor is higher than a preset threshold temperature, the controller controls the valve modules to prevent water from flowing into the cold-water tank.

8 Claims, 2 Drawing Sheets

(51) Int. Cl.
*B67D 1/08* (2006.01)
*B67D 1/12* (2006.01)
*C02F 1/00* (2023.01)
*G05D 11/16* (2006.01)
*G05D 23/13* (2006.01)

(52) U.S. Cl.
CPC ............ *B67D 1/1277* (2013.01); *C02F 1/003* (2013.01); *G05D 11/16* (2013.01); *G05D 23/1393* (2013.01); *B67D 1/0884* (2013.01); *B67D 2001/1263* (2013.01); *B67D 2210/0001* (2013.01); *C02F 2201/005* (2013.01); *C02F 2209/02* (2013.01); *C02F 2209/40* (2013.01); *C02F 2307/10* (2013.01)

(58) Field of Classification Search
CPC ................ B67D 1/1277; B67D 1/0884; B67D 2001/1263; B67D 2210/0001; C02F 1/003; C02F 2201/005; C02F 2209/02; C02F 2209/40; C02F 2307/10
USPC ......................................... 210/243, 143, 181
See application file for complete search history.

(56) References Cited

FOREIGN PATENT DOCUMENTS

| | | | | |
|---|---|---|---|---|
| KR | 100986823 B1 | * | 10/2010 | ........... F25D 31/005 |
| KR | 20130103976 A | * | 9/2013 | ............... F24H 1/48 |

OTHER PUBLICATIONS

Machine-generated English translation of CN 211668042, generated on May 13, 2026.*
Machine-generated English translation of KR 0155218, generated on May 13, 2026.*
Machine-generated English translation of KR 100986823, generated on May 13, 2026.*

* cited by examiner

WATER MIXING DEVICE AND WATER PURIFIER INCLUDING THE SAME

TECHNICAL FIELD

The present disclosure relates to a water mixing device and a water purifier including the water mixing device.

BACKGROUND

In general, a water purifier is a device that receives water from a water source such as tap water, filters the water into purified water through a filter provided therein, and then supplies the purified water to a user. Such a water purifier may provide not only purified water but also hot and cold water to a user. A conventional water purifier may include a filter that filters raw water into purified water, a purified-water tank that stores purified water, and a cold-water tank that stores cold water.

However, the conventional water purifier is problematic in that the temperature of the cold water stored in the cold-water tank may increase as water is replenished in the cold-water tank after the cold water is dispensed, so the amount of cold water to be supplied to a user may be less than the capacity of the cold-water tank.

As a technology for preventing the temperature of cold water stored in the cold-water tank from rising, Korean Patent Publication No. 10-2019-0115270 filed by the same applicant as the present disclosure and entitled "Water purifier including cold-water tank and control method thereof" (Patent Document 1) discloses a water purifier including a storage tank that stores purified water, a cold-water tank that stores the purified water introduced from the storage tank, a cooler that cools the purified water contained in the cold-water tank, a temperature sensor that detects the temperature of cold water, and a water level sensor that detects the level of the cold water in the cold-water tank.

However, the water purifier of Patent Document 1 does not consider the temperature of the contained cold water when purified water flows into the cold-water tank. In other words, the water purifier of Patent Document 1 is problematic in that purified water is introduced when the water level drops below a low water level sensor regardless of the temperature of the cold water in the cold-water tank, so the temperature of the cold water increases, making it impossible to provide purified water at temperature desired by a user. Therefore, the water purifier of Patent Document 1 is problematic in that the purified water flows into the cold-water tank even if the temperature of the cold water contained in the cold-water tank rises excessively when the level of the cold water in the cold-water tank detected by the water level sensor of the water purifier decreases, so the temperature of the cold water contained in the cold-water tank cannot be precisely controlled.

SUMMARY

In view of the above, the present disclosure provides a water mixing device and a water purifier including the water mixing device, which can precisely control the temperature of water contained in a cold-water tank.

In accordance with a first aspect of the present disclosure, there is provided a water mixing device including: a cold-water module including a cold-water tank that accommodates water, a cooler that cools the water accommodated in the cold-water tank, and a cold-water temperature sensor that detects a temperature of the water accommodated in the cold-water tank; a hot-water module including a hot-water tank that accommodates water discharged from the cold-water tank, and a heater that heats the water accommodated in the hot-water tank; a flow channel connected to the cold-water tank and the hot-water tank to provide a passage through which water flows; a valve unit including one or more valve modules opened or closed to adjust a flow of water in the flow channel; and a controller configured to control the one or more valve modules, wherein the flow channel mixes water cooled by the cooler and water heated by the heater to provide discharge water, and wherein when the temperature of water detected by the cold-water temperature sensor is higher than a preset threshold temperature, the controller controls the one or more valve modules to prevent water from flowing into the cold-water tank.

The cold-water module may further include a water level sensor for detecting a level of the water accommodated in the cold-water tank, and when the temperature of the water detected by the cold-water temperature sensor is higher than the preset threshold temperature and the level of the water detected by the water level sensor does not reach a preset threshold water level, the controller may control the one or more valve modules so that the level of the water accommodated in the cold-water tank reaches the preset threshold water level.

The cold-water tank may include a water inlet through which water flows and a cold-water supply port for discharging the water accommodated in the cold-water tank to the hot-water tank, and the cold-water temperature sensor may be placed closer to the cold-water supply port than the water inlet.

When water is discharged from the hot-water tank, the controller may control opening and closing of the one or more valve modules so that water is discharged from the cold-water tank to the hot-water tank and water flows into the cold-water tank.

When the temperature of the water detected by the cold-water temperature sensor reaches a preset operating temperature that is higher than the preset threshold temperature, the controller may operate the cooler to cool water accommodated in the cold-water tank.

After water is blocked from flowing into the cold-water tank, the controller may operate the cooler, after a predetermined waiting time, so that water flowing into the cold-water tank and water previously stored in the cold-water tank and cooled form thermal equilibrium, while stopping the cooler before the waiting time has elapsed.

The controller may control opening and closing of the one or more valve modules to allow water to flow into the cold-water tank when the temperature of the water detected by the cold-water temperature sensor falls below the preset threshold temperature before the waiting time has elapsed.

In accordance with a second aspect of the present disclosure, there is provided a water purifier including: the water mixing device described above; and a filter unit that filters water and provides the water to the water mixing device.

According to an aspect of the present disclosure, a controller of a water purifier can prevent the temperature of a cold-water tank from increasing by preventing purified water from flowing into the cold-water tank based on the temperature of purified water contained in the cold-water tank, thereby allowing the temperature of discharged water to be precisely controlled.

Since a controller does not control the temperature of purified water contained in a cold-water tank until a level of purified water contained in the cold-water tank reaches a threshold water level, power consumption for opening/closing of a valve module and cooling can be reduced.

Further, since a cold-water temperature sensor can be placed closer to a cold-water supply port than a purified-water inlet, the temperature of cold water discharged from a cold-water tank can be accurately measured.

Further, since a cooler can be driven after purified water contained in a cold-water tank reaches thermal equilibrium, it can be prevented from operating due to a temporary increase in the temperature of the purified water each time the purified water flows into the cold-water tank.

DETAILED DESCRIPTION

Hereinafter, specific embodiments for implementing a spirit of the present disclosure will be described in detail with reference to the drawings.

In describing the present disclosure, detailed descriptions of known configurations or functions may be omitted to clarify the present disclosure.

When an element is referred to as being 'connected' to, or 'flowed' into another element, it should be understood that the element may be directly connected to, or, flowed into another element, but that other elements may exist in the middle.

The terms used in the present disclosure are only used for describing specific embodiments, and are not intended to limit the present disclosure. Singular expressions include plural expressions unless the context clearly indicates otherwise.

Further, in the present disclosure, it is to be noted that expressions, such as the upper side and the lower side, are described based on the illustration of drawings, but may be modified if directions of corresponding objects are changed. For the same reasons, some components are exaggerated, omitted, or schematically illustrated in the accompanying drawings, and the size of each component does not fully reflect the actual size.

Terms including ordinal numbers, such as first and second, may be used for describing various elements, but the corresponding elements are not limited by these terms. These terms are only used for the purpose of distinguishing one element from another element.

In the present specification, it is to be understood that the terms such as "including" are intended to indicate the existence of the certain features, areas, integers, steps, actions, elements, combinations, and/or groups thereof disclosed in the specification, and are not intended to preclude the possibility that one or more other certain features, areas, integers, steps, actions, elements, combinations, and/or groups thereof may exist or may be added.

Hereinafter, a water mixing device 10 and a water purifier 1 including the water mixing device 10 according to an embodiment of the present disclosure will be described with reference to the drawings.

Figure 1:
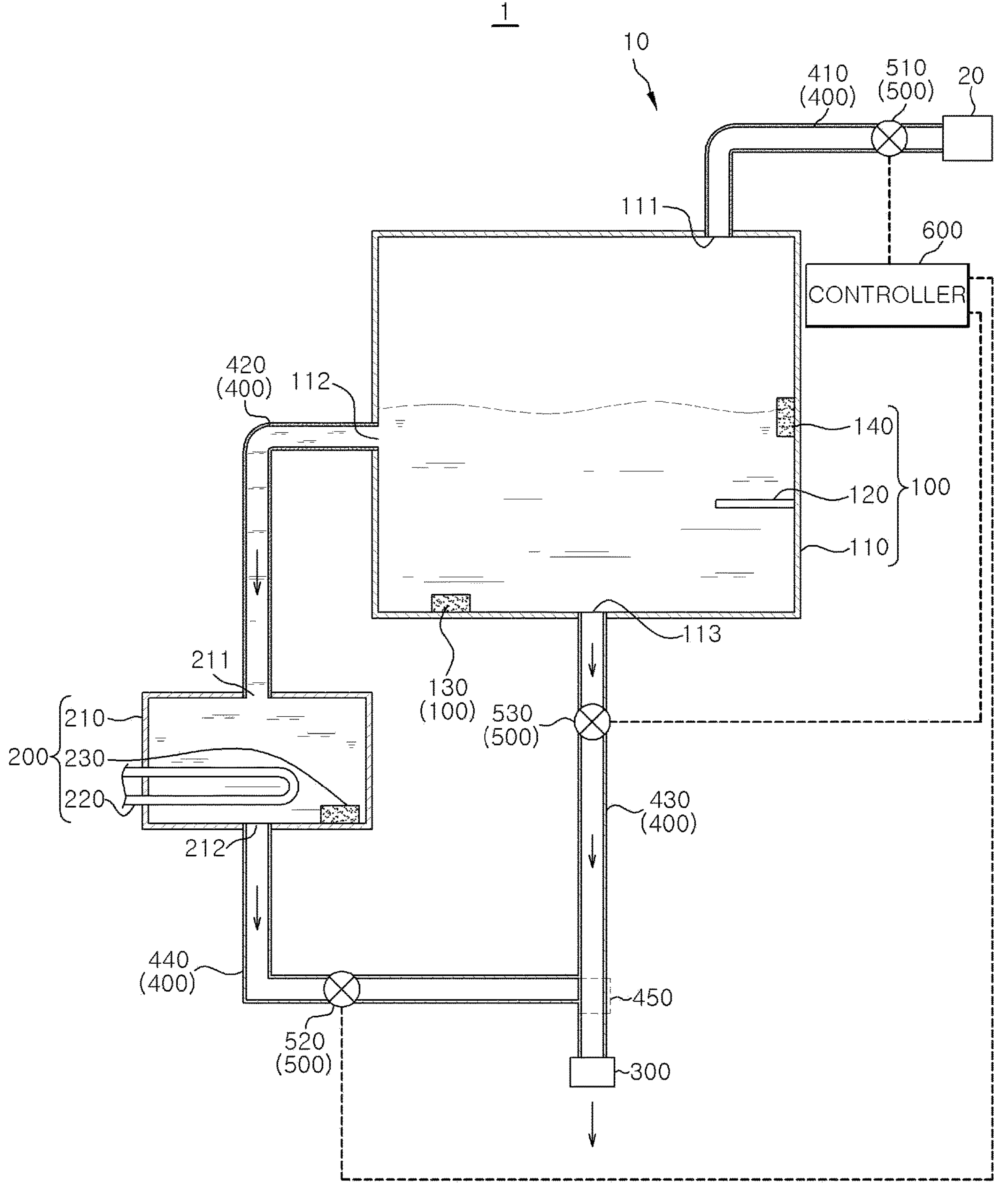
FIG. 1 is a diagram illustrating cold water being discharged from a cold-water tank of a water mixing device and a water purifier including the water mixing device according to an embodiment of the present disclosure.

Referring to FIG. 1, the water purifier 1 according to the embodiment of the present disclosure may provide clean water to a user by filtering water supplied from the outside.

For example, the water purifier 1 may be supplied with water from a water source (not shown) such as tap water, and may filter the supplied water into purified water. Such a water purifier 1 may include a water mixing device 10 and a filter unit 20.

The water mixing device 10 may mix heated water and cooled water to provide a user with mixed water corresponding to a temperature requested by the user. Such a water mixing device 10 may include a cold-water module 100, a hot-water module 200, a discharge port 300, a flow channel 400, a valve unit 500, and a controller 600.

The cold-water module 100 may cool water to a predetermined temperature or lower. In other words, the cold-water module 100 may form cold water. Such a cold-water module 100 may include a cold-water tank 110, a cooler 120, a cold-water temperature sensor 130, and a water level sensor 140.

The cold-water tank 110 may provide a space to accommodate water introduced therein. Further, the cold-water tank 110 may be disposed above the hot-water module 200 and then be configured to discharge cold water to a hot-water tank 210 when hot water is discharged from the hot-water tank 210 of the hot-water module 200, which will be described later. Further, a water inlet 111, a cold-water supply port 112, and a cold-water discharge port 113 may be formed in the cold-water tank 110.

The water inlet 111 is a through hole that communicates the inside of the cold-water tank 110 with a water inflow path 410 of the flow channel 400, which will be described later. Through the water inlet 111, water flowing in the water inflow path 410 may be introduced into the cold-water tank 110. For example, the water inlet 111 may be formed on an upper side of the cold-water tank 110.

The cold-water supply port 112 is a through hole that communicates the inside of the cold-water tank 110 with a cold-water supply path 420 of the flow channel 400, which will be described later. Through the cold-water supply port 112, cold water contained in the cold-water tank 110 may be discharged to the cold-water supply path 420. Further, the cold-water supply port 112 may be disposed under the water inlet 111.

The cold-water discharge port 113 is a through hole that communicates the inside of the cold-water tank 110 with a cold-water discharge path 430 of the flow channel 400, which will be described later. Through the cold-water discharge port 113, cold water contained in the cold-water tank 110 may be discharged to the cold-water discharge path 430.

The cooler 120 may be supported by the cold-water tank 110 to cool water contained in the cold-water tank 110.

The cold-water temperature sensor 130 may detect the temperature of water contained in the cold-water tank 110. Such a cold-water temperature sensor 130 may be disposed closer to either of the cold-water supply port 112 or the cold-water discharge port 113 than the water inlet 111. For example, the cold-water temperature sensor 130 may be provided in a bottom of the cold-water tank 110 and placed closer to the cold-water discharge port 113 than the water inlet 111 and the cold-water supply port 112. Through the cold-water temperature sensor 130, the temperature of cold water discharged from the cold-water tank 110 can be accurately measured.

The water level sensor 140 may be disposed in the cold-water tank 110 to detect the level of water contained in the cold-water tank 110. Such a water level sensor 140 may be placed at a predetermined height spaced apart from the bottom of the cold-water tank 110, and be configured to detect water and measure the level of the water when the level of water in the cold-water tank 110 reaches a predetermined height. However, the present disclosure is not limited thereto. In other words, the water level sensor 140 may detect a threshold water level, which will be described later.

The hot-water module 200 may heat water introduced therein to exceed a predetermined temperature. Further, cold water discharged from the cold-water module 100 may be introduced into the hot-water module 200. In other words, the hot-water module 200 may heat the cold water into hot water. Such a hot-water module 200 may include a hot-water tank 210, a heater 220, and a hot-water temperature sensor 230.

The hot-water tank 210 may provide a space that accommodates water discharged from the cold-water tank 110. The hot-water tank 210 may be disposed under the cold-water tank 110. Such a hot-water tank 210 may accommodate water therein so that air is not accommodated. In other words, water may be continuously accommodated from the hot-water tank 210 to the cold-water tank 110. A connecting hole 211 and a hot-water discharging hole 212 may be formed in the hot-water tank 210.

The connecting hole 211 is a through hole that communicates the inside of the hot-water tank 210 with the cold-water supply path 420 of the flow channel 400. Through such a connecting hole 211, water flowing in the cold-water supply path 420 may be introduced into the hot-water tank 210.

The hot-water discharging hole 212 is a through hole that communicates the inside of the hot-water tank 210 with a hot-water discharge path 440 of the flow channel 400, which will be described later. Through such a hot-water discharging hole 212, hot water accommodated in the hot-water tank 210 may be discharged to the hot-water discharge path 440.

The heater 220 may be supported by the hot-water tank 210 to heat water accommodated in the hot-water tank 210.

The hot-water temperature sensor 230 may detect the temperature of water accommodated in the hot-water tank 210. Further, the hot-water temperature sensor 230 may be disposed adjacent to the hot-water discharging hole 212 to accurately measure the temperature of hot water discharged from the hot-water discharging hole 212. For example, the hot-water temperature sensor 230 may be placed on a bottom of the hot-water tank 210.

The discharge port 300 may discharge water flowing in the flow channel 400 to the outside and then provide the water to a user. Hereinafter, water discharged from the discharge port 300 is referred to as a discharge water. For example, the discharge port 300 may be connected to a cold-water discharge path 430 of the flow channel 400, which will be described later. However, the present disclosure is not limited thereto.

The flow channel 400 may provide a passage to allow water to flow between the cold-water tank 110, the hot-water tank 210, and the discharge port 300. Further, water cooled in the cooler 120 and water heated in the heater 220 may be mixed in the flow channel 400. In other words, the flow channel 400 may provide the discharge water that is a mixture of cold water and hot water. Such a flow channel 400 may include a water inflow path 410, a cold-water supply path 420, a cold-water discharge path 430, a hot-water discharge path 440, and a water mixing portion 450.

Figure 2:
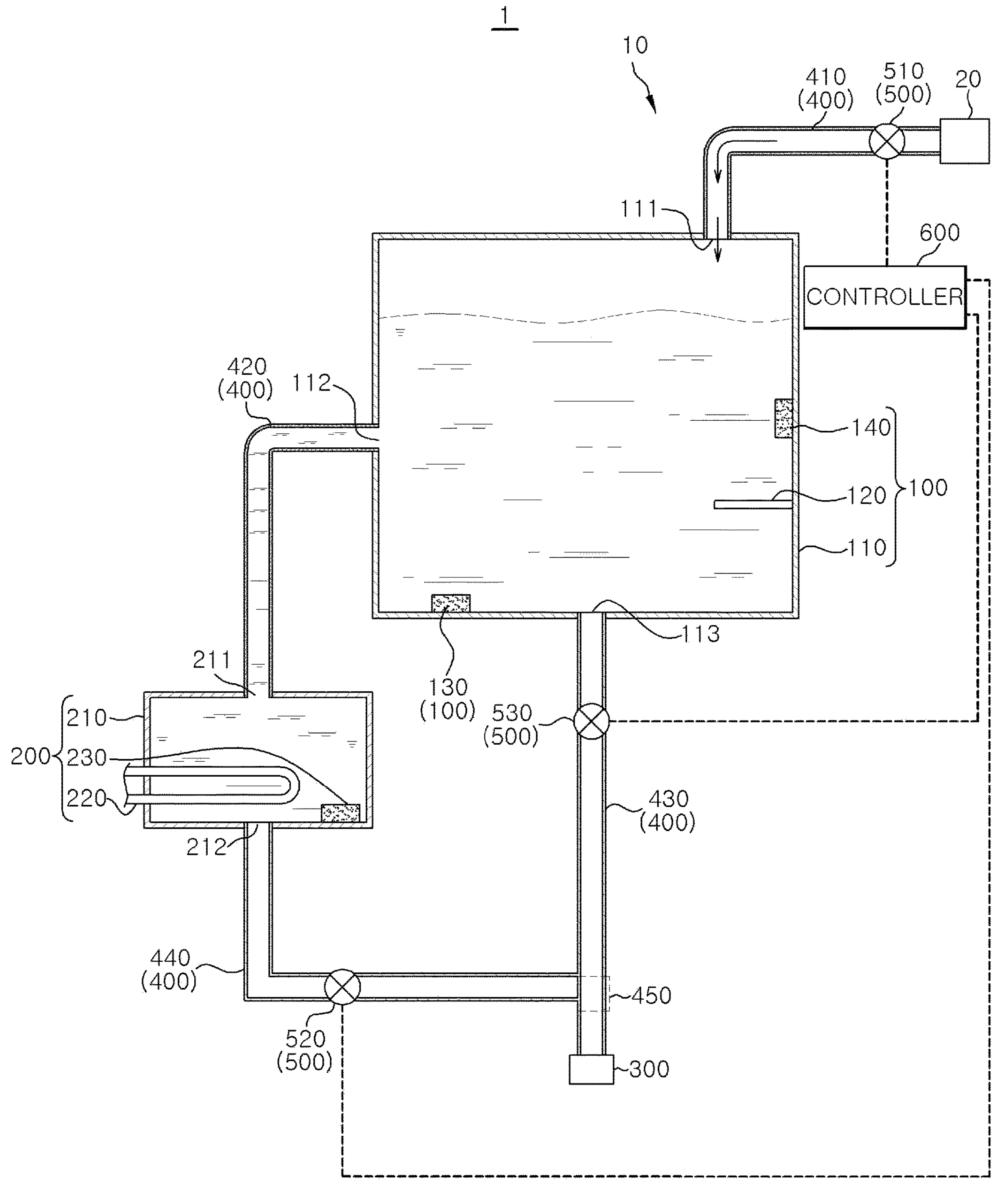
FIG. 2 is a diagram illustrating purified water flowing into the cold-water tank of the water purifier in FIG. 1.

Referring to FIG. 2, the water inflow path 410 may be connected to the cold-water tank 110 to provide a passage that allows water to flow to the cold-water tank 110. Through the water inflow path 410, water may flow to the cold-water tank 110.

The cold-water supply path 420 may be connected to the cold-water tank 110 and the hot-water tank 210 to provide a passage that allows cold water discharged from the cold-water tank 110 to flow to the hot-water tank 210. Through the cold-water supply path 420, the cold water may be introduced into the hot-water tank 210.

The cold-water discharge path 430 may be connected to the cold-water tank 110 to provide a passage that allows cold water discharged from the cold-water tank 110 to flow to the discharge port 300. Through the cold-water discharge path 430, cold water may flow to the discharge port 300.

The hot-water discharge path 440 may be connected to the hot-water tank 210 to provide a passage that allows hot water discharged from the hot-water tank 210 to flow to the discharge port 300. Through the hot-water discharge path 440, hot water may flow to the discharge port 300.

Further, the cold-water discharge path 430 and the hot-water discharge path 440 may be connected to each other so that hot water and cold water are mixed and flow to the discharge port 300. In other words, the discharge water that is the mixture of hot water and cold water may be provided at a point where the cold-water discharge path 430 and the hot-water discharge path 440 are connected. For example, one side of the hot-water discharge path 440 may be connected to the hot-water tank 210, and the other side opposite to one side may be connected to the cold-water discharge path 430. Further, the water mixing portion 450 may include the point where the cold-water discharge path 430 and the hot-water discharge path 440 are connected.

The valve unit 500 may include one or more valve modules that are opened or closed to control the flow of water in the flow channel 400. The one or more valve modules may include an inlet valve module 510, a mixed hot-water valve module 520, and a mixed cold-water valve module 530.

The inlet valve module 510 may selectively open or close the water inflow path 410 to allow water to flow into the cold-water tank 110. In other words, when the water inflow path 410 is opened by the inlet valve module 510, water may be introduced into the cold-water tank 110.

The mixed hot-water valve module 520 may selectively open or close the hot-water discharge path 440 to discharge hot water from the hot-water tank 210. In other words, when the hot-water discharge path 440 is opened by the mixed hot-water valve module 520, hot water contained in the hot-water tank 210 may flow through the hot-water discharge path 440 to the discharge port 300. Further, the mixed hot-water valve module 520 may be controlled to adjust the amount of hot water discharged from the hot-water tank 210. Through the mixed hot-water valve module 520, the ratio of hot water to the discharge water may be adjusted. For example, the mixed hot-water valve module 520 may adjust the opening degree of the hot-water discharge path 440 to adjust the amount of hot water.

The mixed cold-water valve module 530 may selectively open or close the cold-water discharge path 430 to discharge cold water from the cold-water tank 110. In other words, when the cold-water discharge path 430 is opened by the mixed cold-water valve module 530, cold water contained in the cold-water tank 110 may flow through the cold-water discharge path 430 to the discharge port 300. Further, the mixed cold-water valve module 530 may be controlled to adjust the amount of cold water discharged from the cold-water tank 110. Through the mixed cold-water valve module 530, the ratio of cold water to the discharge water may be adjusted. For example, the mixed cold-water valve module

530 may adjust the opening degree of the cold-water discharge path 430 to adjust the amount of cold water.

When the mixed hot-water valve module 520 and the mixed cold-water valve module 530 are simultaneously opened, hot water and cold water may be mixed in a portion where the cold-water discharge path 430 and the hot-water discharge path 440 are joined.

The controller 600 may control the cold-water module 100, the hot-water module 200, and one or more valve modules to adjust the temperature of the discharge water discharged from the discharge port 300. The controller 600 may control one or more valve modules to lower the temperature of the discharge water. In other words, the controller 600 may control the mixed cold-water valve module 530 and the mixed hot-water valve module 520 to increase the ratio of cold water to the discharge water. Further, the controller 600 may control one or more valve modules to increase the temperature of the discharge water. In other words, the controller 600 may control the mixed cold-water valve module 530 and the mixed hot-water valve module 520 to increase the ratio of hot water to the discharge water.

When water is discharged from one or more of the hot-water tank 210 and the cold-water tank 110, the controller 600 may control one or more valve modules so that water flows into the cold-water tank 110. As an example, when one or more of the mixed cold-water valve module 530 and the mixed hot-water valve module 520 are opened, the controller 600 may also control the inlet valve module 510. As another example, the controller 600 may open the inlet valve module 510 after the mixed cold-water valve module 530 and the mixed hot-water valve module 520 are closed.

Further, the controller 600 may control one or more valve modules so that the amount of cold water discharged from the cold-water tank 110 and the amount of water introduced into the cold-water tank 110 are equal to each other. For example, the controller 600 may control one or more valve modules so that the flow rate of cold water discharged from the cold-water tank 110 and the flow rate of water introduced into the cold-water tank 110 are equal to each other through a separate flow-rate sensor (not shown). The separate flow-rate sensor may be disposed in one or more of the water inflow path 410, the cold-water supply path 420, the cold-water discharge path 430, and the hot-water discharge path 440.

The controller 600 may control one or more valve modules to prevent water from flowing into the cold-water tank 110, when the temperature of water detected by the cold-water temperature sensor 130 is higher than a preset threshold temperature. In other words, when water is introduced into the cold-water tank 110 and then the temperature of water contained in the cold-water tank 110 becomes higher than the preset threshold temperature, the controller 600 may control the inlet valve module 510 to close the water inflow path 410.

The controller 600 may control one or more valve modules so that the level of water contained in the cold-water tank 110 reaches the threshold water level, when the temperature of water detected by the cold-water temperature sensor 130 is higher than a preset threshold temperature and the level of water detected by the water level sensor 140 does not reach a preset threshold water level. In other words, the controller 600 may control the inlet valve module 510 to open the water inflow path 410 so that the level of water contained in the cold-water tank 110 reaches the threshold water level. For example, when the water level sensor 140 detects water, the controller 600 may determine that the threshold water level has been reached. By using the controller 600, when the temperature of water contained in the cold-water tank 110 is higher than the threshold temperature but the water level is lower than the threshold water level, water may be continuously introduced into the cold-water tank 110.

If the temperature detected by the cold-water temperature sensor 130 is higher than the threshold temperature after the level of water contained in the cold-water tank 110 reaches the threshold water level, the controller 600 may control one or more valve modules to prevent water from flowing into the cold-water tank 110.

If the temperature of water detected by the cold-water temperature sensor 130 reaches a preset operating temperature that is higher than the threshold temperature, the controller 600 may drive the cooler 120 to cool water contained in the cold-water tank 110. With the controller 600, water contained in the cold-water tank 110 can be cooled when water is blocked from flowing into the cold-water tank 110 and the temperature of water contained in the cold-water tank 110 reaches the operating temperature.

Further, even if the temperature of water contained in the cold-water tank 110 reaches the operating temperature after water is blocked from flowing into the cold-water tank 110, the controller 600 may operate the cooler 120 after a predetermined waiting time. In other words, even if the temperature of water reaches the operating temperature after water is blocked from flowing into the cold-water tank 110, the controller 600 may stop the cooler 120 before the waiting time has elapsed. With the controller 600, water introduced into the cold-water tank 110 during the waiting time and water previously accommodated in the cold-water tank 110 and cooled may form thermal equilibrium. Due to the thermal equilibrium, the cold-water temperature sensor 130 disposed on the bottom of the cold-water tank 110 can accurately measure the temperature of water contained in the cold-water tank 110.

Further, if the temperature of water detected by the cold-water temperature sensor 130 falls below the threshold temperature before the waiting time has elapsed, the controller 600 may control the opening or closing of one or more valve modules to allow water to flow into the cold-water tank 110. In other words, if the temperature of water accommodated in the cold-water tank 110 falls below the threshold temperature before the waiting time has elapsed, the controller 600 allows water to flow into the cold-water tank 110.

The above-described controller 600 may be implemented by an operational unit including a microprocessor, a measurement device such as a sensor, and a memory. Since its implementation method is obvious to those skilled in the art, a detailed description thereof is omitted.

The filter unit 20 may filter water supplied from the outside and then provide it as purified water. The purified water may flow into the water mixing device 10. In other words, water heated or cooled in the water mixing device 10 may be purified water. The filter unit 20 may be disposed in the water inflow path 410.

Hereinafter, the operation and effects of the water mixing device and the water purifier 1 including the water mixing device according to the embodiment of the present disclosure will be described.

The water purifier 1 according to the embodiment of the present disclosure may discharge the discharge water at a temperature requested by a user through the discharge port 300. The controller 600 of the water purifier 1 may control one or more valve modules to discharge the discharge water at the temperature requested by the user. When the discharge water is discharged to the outside, the controller 600 may operate the cooler to maintain the temperature of the cold water accommodated in the cold-water tank 110. Further, the controller 600 may operate the heater 220 to maintain the temperature of water accommodated in the hot-water tank 210 into which the cold water discharged from the cold-water tank 110 is flowed. When the amount of the discharge water desired by the user is discharged to the outside, the controller 600 may control one or more valve modules to prevent the discharge water from being discharged to the outside.

Subsequently, the controller 600 may control one or more valve modules so that the amount of water corresponding to the amount of cold water discharged from the cold-water tank 110 flows into the cold-water tank 110. When water flows into the cold-water tank 110 so that the level of the water accommodated in the cold-water tank 110 reaches the threshold water level and the threshold temperature of the water is reached, the controller 600 may control one or more valve modules to prevent water from flowing into the cold-water tank 110. Further, when the temperature of the water accommodated in the cold-water tank 110 reaches the operating temperature and the waiting time has elapsed, the controller 600 may operate the cooler 120 to cool the water. When the temperature of water accommodated in the cold-water tank 110 is below the threshold temperature and the amount of water flowing into the cold-water tank 110 does not correspond to the amount of cold water discharged from the cold-water tank 110, the controller 600 may control one or more valve modules to allow water to flow into the cold-water tank 110 again.

Since the controller 600 of the water purifier 1 may prevent the temperature of the cold-water tank 110 from increasing by blocking water from flowing into the cold-water tank 110 based on the temperature of the water accommodated in the cold-water tank 110, the temperature of the discharge water can be precisely controlled.

Further, since the controller 600 does not control the temperature of water accommodated in the cold-water tank 110 until the level of the water accommodated in the cold-water tank 110 reaches the threshold water level, power consumption for opening and closing the valve module and cooling can be reduced.

Further, since the cold-water temperature sensor 130 may be placed closer to the cold-water supply port 112 than the water inlet 111, the temperature of cold water discharged from the cold-water tank 110 can be accurately measured.

Further, since the cooler 120 may be driven after water contained in the cold-water tank 110 reaches thermal equilibrium, it can be prevented from operating due to a temporary increase in the temperature of the water each time the water flows into the cold-water tank 110.

The examples of the present disclosure have been described above as specific embodiments, but these are only examples, and the present disclosure is not limited thereto, and should be construed as having the widest scope according to the technical spirit disclosed in the present specification. A person skilled in the art may combine/substitute the disclosed embodiments to implement a pattern of a shape that is not disclosed, but it also does not depart from the scope of the present disclosure. In addition, those skilled in the art can easily change or modify the disclosed embodiments based on the present specification, and it is clear that such changes or modifications also belong to the scope of the present disclosure.

What is claimed is:

1. A water mixing device comprising:

a cold-water module including a cold-water tank that accommodates water, a cooler that cools the water accommodated in the cold-water tank, and a cold-water temperature sensor that detects a temperature of the water accommodated in the cold-water tank;

a hot-water module including a hot-water tank that accommodates water discharged from the cold-water tank, and a heater that heats the water accommodated in the hot-water tank;

a flow channel connected to the cold-water tank and the hot-water tank to provide a passage through which water flows;

a valve unit including one or more valve modules opened or closed to adjust a flow of water in the flow channel; and a controller configured to control the one or more valve modules, wherein the flow channel mixes water cooled by the cooler and water heated by the heater to provide discharge water, and wherein when the temperature of water detected by the cold-water temperature sensor is higher than a preset threshold temperature, the controller controls the one or more valve modules to prevent water from flowing into the cold-water tank.

2. The water mixing device of claim 1, wherein the cold-water module further includes a water level sensor for detecting a level of the water accommodated in the cold-water tank, and wherein when the temperature of the water detected by the cold-water temperature sensor is higher than the preset threshold temperature and the level of the water detected by the water level sensor does not reach a preset threshold water level, the controller controls the one or more valve modules so that the level of the water accommodated in the cold-water tank reaches the preset threshold water level.

3. The water mixing device of claim 1, wherein the cold-water tank includes a water inlet through which water flows and a cold-water supply port for discharging the water accommodated in the cold-water tank to the hot-water tank, and wherein the cold-water temperature sensor is placed closer to the cold-water supply port than the water inlet.

4. The water mixing device of claim 1, wherein when water is discharged from the hot-water tank, the controller controls opening and closing of the one or more valve modules so that water is discharged from the cold-water tank to the hot-water tank and water flows into the cold-water tank.

5. The water mixing device of claim 1, wherein when the temperature of the water detected by the cold-water temperature sensor reaches a preset operating temperature that is higher than the preset threshold temperature, the controller operates the cooler to cool water accommodated in the cold-water tank.

6. The water mixing device of claim 5, wherein after water is blocked from flowing into the cold-water tank, the controller operates the cooler, after a predetermined waiting time, so that water flowing into the cold-water tank and water previously stored in the cold-water tank and cooled form thermal equilibrium, while stopping the cooler before the waiting time has elapsed.

7. The water mixing device of claim 6, wherein the controller controls opening and closing of the one or more valve modules to allow water to flow into the cold-water tank when the temperature of the water detected by the cold-water temperature sensor falls below the preset threshold temperature before the waiting time has elapsed.

8. A water purifier comprising:

the water mixing device of claim 1; and a filter unit that filters water and provides the water to the water mixing device.

* * * * *